(12) United States Patent
Kim et al.

(10) Patent No.: US 11,411,255 B2
(45) Date of Patent: Aug. 9, 2022

(54) BATTERY PACK

(71) Applicant: SAMSUNG SDI CO., LTD., Yongin-si (KR)

(72) Inventors: Hwa-Su Kim, Yongin-si (KR); Thomas Trathnigg, Zettling (AT)

(73) Assignee: Samsung SDI Co., Ltd., Yongin-si (KR)

( * ) Notice: Subject to any disclaimer, the term of this patent is extended or adjusted under 35 U.S.C. 154(b) by 612 days.

(21) Appl. No.: 16/347,540

(22) PCT Filed: Sep. 15, 2017

(86) PCT No.: PCT/KR2017/010129
§ 371 (c)(1),
(2) Date: May 3, 2019

(87) PCT Pub. No.: WO2018/088685
PCT Pub. Date: May 17, 2018

(65) Prior Publication Data
US 2021/0119267 A1    Apr. 22, 2021

(30) Foreign Application Priority Data

Nov. 8, 2016  (KR) .......................... 10-2016-0148228

(51) Int. Cl.
| | | |
|---|---|---|
| *H01M 10/42* | (2006.01) | |
| *H01M 50/204* | (2021.01) | |
| *H01M 10/44* | (2006.01) | |
| *H02J 7/00* | (2006.01) | |

(52) U.S. Cl.
CPC ..... *H01M 10/425* (2013.01); *H01M 10/4207* (2013.01); *H01M 10/448* (2013.01); *H01M 50/204* (2021.01); *H02J 7/0019* (2013.01); *H02J 7/0047* (2013.01); *H01M 2010/4271* (2013.01)

(58) Field of Classification Search
CPC ........... H01M 10/425; H01M 10/4207; H01M 10/448; H01M 2010/4271; H02J 7/0019; H02J 7/0047
See application file for complete search history.

(56) References Cited

U.S. PATENT DOCUMENTS

| | | |
|---|---|---|
| 2010/0019732 A1 | 1/2010 | Utsumi et al. |
| 2010/0026241 A1 | 2/2010 | Kang et al. |
| 2010/0123434 A1 | 5/2010 | Iwata |
| 2013/0187610 A1 | 7/2013 | Hayashi et al. |
| 2013/0200852 A1 | 8/2013 | Song |
| 2015/0084597 A1 | 3/2015 | Kim et al. |

FOREIGN PATENT DOCUMENTS

| | | |
|---|---|---|
| JP | 4003689 B2 | 11/2007 |
| JP | 2011-223872 A | 11/2011 |
| JP | 2013-153596 A | 8/2013 |
| JP | 5448564 B2 | 3/2014 |
| KR | 10-2009-0011497 A | 2/2009 |
| KR | 10-2010-0008325 A | 1/2010 |
| KR | 10-1162515 B1 | 6/2012 |
| KR | 10-2012-0119165 A | 10/2012 |
| KR | 10-2013-0091066 A | 8/2013 |
| KR | 10-2014-0132890 A | 11/2014 |
| KR | 10-2015-0025433 A | 3/2015 |

OTHER PUBLICATIONS

Korean Notice of Allowance dated Feb. 24, 2021 for corresponding Korean Application No. 10-2016-0148228.
International Search Report dated Dec. 12, 2017 for PCT/KR2017/010129.

*Primary Examiner* — Sarah A. Slifka
(74) *Attorney, Agent, or Firm* — Lee IP Law, P.C.

(57) ABSTRACT

A battery pack may include: a battery configured to include a plurality of cells; a cell balancing circuit configured to include a discharge circuit for each of the cells; a controller configured to output a first complete discharge command signal based on a control signal inputted from the outside; a mechanical switch configured to output a second complete discharge signal by mechanical manipulation; and a cell balancing controller configured to control the cell balancing circuit such that complete discharge of each cell is performed through the discharge circuits when the first complete discharge signal and the second complete discharge signal are received.

18 Claims, 3 Drawing Sheets

BATTERY PACK

CROSS-REFERENCE TO THE RELATED APPLICATION

This is the U.S. national phase application based on PCT Application No. PCT/KR2017/010129, filed Sep. 15, 2017, which is based on Korean Patent Application No. 10-2016-0148228, filed Nov. 8, 2016, the entire contents of all of which are hereby incorporated by reference.

TECHNICAL FIELD

An exemplary embodiment relates to a battery pack.

BACKGROUND ART

Recently, according to strengthening of environmental regulations including $CO_2$ regulations, interest in environmentally-friendly vehicles has been increasing. Accordingly, vehicle companies have been actively researching and developing pure electrical vehicles and hydrogen vehicles as well as hybrid and plug-in hybrid vehicles.

A high voltage battery for storing electrical energy obtained from various energy sources is applied to the environmentally-friendly vehicles.

A battery may not only contaminate the environment when a charge remains therein, but also generates heat when a battery terminal is connected to a conductor such as a piece of metal in a state where the charge remains, resulting in explosion or combustion of the battery.

Therefore, it is necessary to be careful when disposing of the battery, and it is important to discharge the battery completely to make it stable before disposal.

DISCLOSURE

Technical Problem

An exemplary embodiment has been made in an effort to provide a battery pack in which a battery can quickly and safely be discharged.

Technical Solution

An exemplary embodiment of the present invention provides a battery pack including: a battery configured to include a plurality of cells; a cell balancing circuit configured to include a discharge circuit for each of the cells; a controller configured to output a first complete discharge command signal based on a control signal inputted from the outside; a mechanical switch configured to output a second complete discharge signal by mechanical manipulation; and a cell balancing controller configured to control the cell balancing circuit such that complete discharge of each cell is performed through the discharge circuits when the first complete discharge signal and the second complete discharge signal are received.

The cell balancing controller may control the cell balancing circuit such that the complete discharge is performed only for cells other than an abnormal cell among the cells.

The cell balancing circuit may further include a plurality of voltage sensors for detecting cell voltages of the cells, and the cell balancing controller may detect abnormal cells based on the cell voltages detected by the voltage sensors.

The controller may detect an abnormal cell among the cells, and may transmit information related to the abnormal cell to the cell balancing controller.

The cell balancing controller may control the cell balancing circuit such that the complete discharge using the discharge circuit is sequentially executed for the cells.

The cell balancing controller may divide the cells into a plurality of cell groups, and may control the cell groups to have different starting times of the complete discharge using the cell balancing circuit.

The cell balancing circuit may further include a plurality of voltage sensors for detecting cell voltages of the cells, and the cell balancing controller may control starting times of the complete discharge using the cell balancing circuit for the cells to be different from each other depending on the cell voltages of the cells.

The cell balancing controller may control the cell balancing circuit to stop the complete discharge using the discharge circuit for cells having discharge currents that are less than a predetermined value.

The cell balancing controller may control the cell balancing circuit to stop the complete discharge using the discharge circuit for cells having cell voltages reaching a discharge stop voltage.

The controller may set the discharge stop voltage based on a control signal received from the outside.

The discharge stop voltage may be a discharge final voltage of each of the cells.

The discharge stop voltage may be set based on an operation voltage of the cell balancing controller.

The discharge circuit may include a discharge resistor and a switch configured to constitute a discharge path of each of the cells, and the cell balancing controller may control the switch to control the complete discharge of each of the cells.

The cell balancing controller may control the cell balancing circuit to perform cell balancing to reduce a voltage difference between the plurality of cells when the cell balancing is requested.

Advantageous Effects

According to the exemplary embodiment, it is possible to secure safety during the complete discharge for discarding the battery, and it is possible to shorten the complete discharge time.

MODE FOR INVENTION

Figure 1:
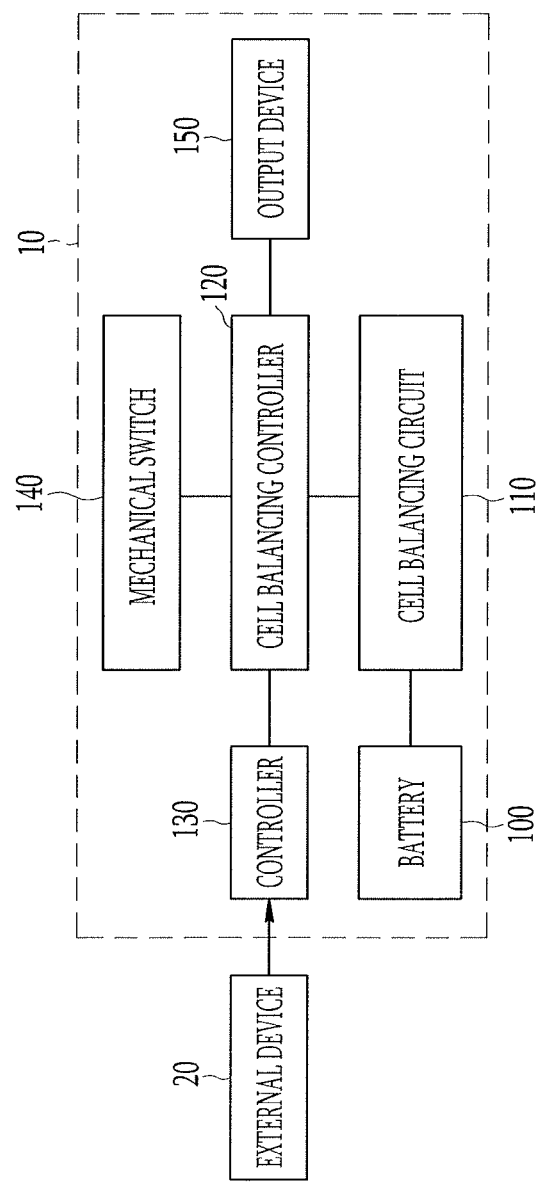
FIG. 1 and FIG. 2 schematically illustrate a battery pack according to an exemplary embodiment.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

To clearly describe the exemplary embodiments, parts that are irrelevant to the description are omitted, and like numerals refer to like or similar constituent elements throughout the specification. Therefore, the reference numbers of the constituent elements used in a previous drawing may be used in a subsequent drawing.

Further, since sizes and thicknesses of constituent members shown in the accompanying drawings are arbitrarily given for better understanding and ease of description, the exemplary embodiments are not limited to the illustrated sizes and thicknesses. In the drawings, the thickness of layers, films, panels, regions, etc., are exaggerated for clarity.

A case of electrically connecting two constituent elements includes not only a case of directly connecting the constituent elements, but also a case of connecting the constituent elements via another constituent element therebetween. The constituent element therebetween may include a switch, a resistor, a capacitor, and the like. In describing exemplary embodiments, an expression of connection indicates electrical connection unless explicitly described to be direct connection.

Hereinafter, a battery pack according to an exemplary embodiment will be described in detail with reference to necessary drawings.

Figure 2:
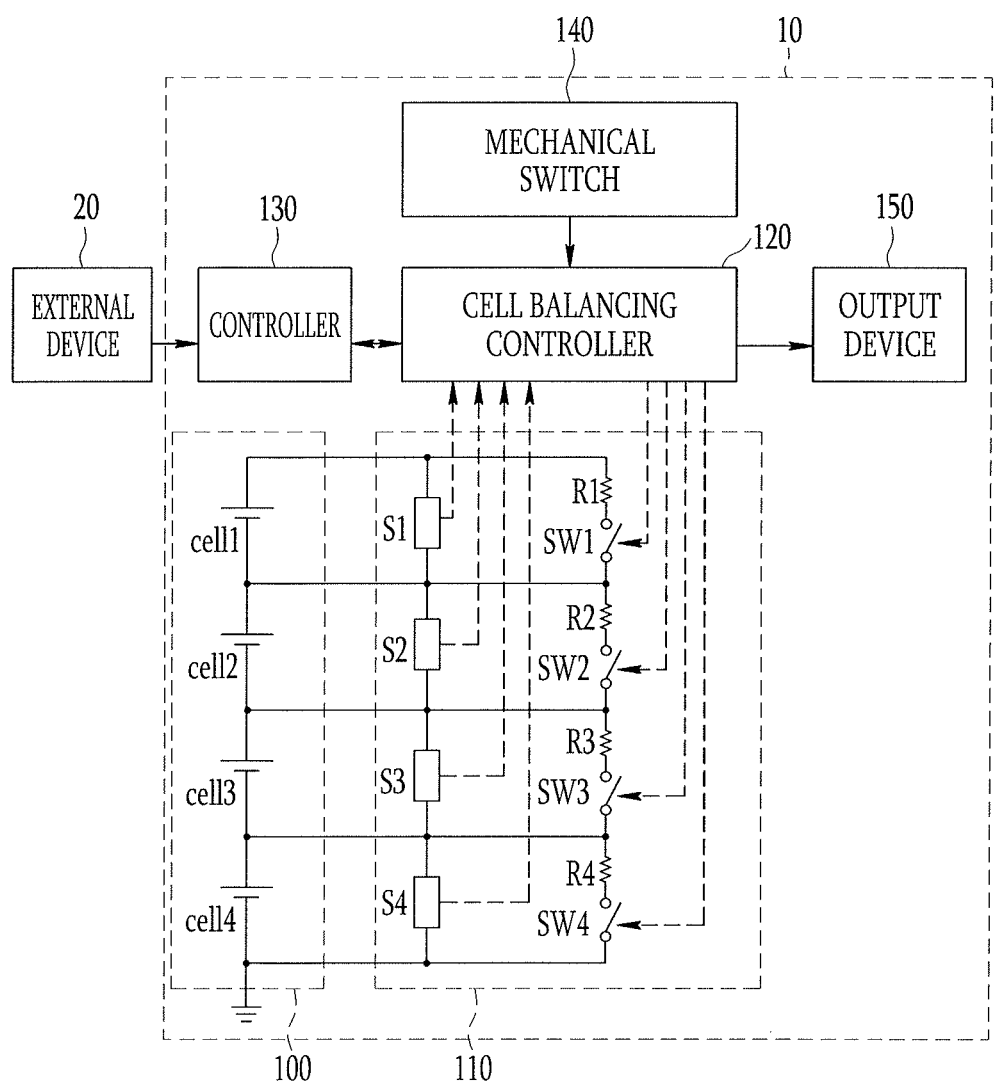

FIG. 1 and FIG. 2 schematically illustrate a battery pack according to an exemplary embodiment.

Referring to FIG. 1 and FIG. 2, according to the present exemplary embodiment, a battery pack 10 may include a battery 100, a cell balancing circuit 110, a cell balancing controller 120, a controller 130, and a mechanical switch 140.

The battery 100 may be a high voltage battery including a plurality of cells cell1, cell2, cell3, and cell4 connected to each other in series. In addition, each of the cells may be a rechargeable battery that can be charged and discharged. Examples of the rechargeable battery used as the cell may include a nickel-cadmium battery, a lead-acid battery, a nickel metal hydride battery (NiMH), a lithium-ion battery, and a lithium polymer battery.

Although a case where the battery 100 includes four cells is illustrated as an example in FIG. 2, the present invention is not limited thereto, and a number of cells included in the battery 100 may be changed depending on a design specification of the battery pack 10.

The cell balancing circuit 110 includes a discharging circuit for each of the cells cell1, cell2, cell3, and cell4 constituting the battery 100 to perform a cell balancing operation for reducing a voltage difference between the cells cell1, cell2, cell3, and cell4.

The cell balancing circuit 110 may include a plurality of discharge resistors R1, R2, R3, and R4 and a plurality of switches SW1, SW2, SW3, and SW4. The discharge resistors R1, R2, R3, and R4 and the switches SW1, SW2, SW3, and SW4 are respectively connected between opposite ends of the cells cell1, cell2, cell3, and cell4 to form discharge paths of the cells cell1, cell2, cell3, and cell4.

The switches SW1, SW2, SW3, and SW4 respectively function to open or close the discharge paths of the cells cell1, cell2, cell3, and cell4. When the discharging paths are closed by the switches SW1, SW2, SW3, and SW4, a discharging current flows through the discharge paths to the discharge resistors R1, R2, R3, and R4, thereby discharging the corresponding cell. The switches SW1, SW2, SW3, and SW4 may be controlled by the cell balancing controller 120.

The cell balancing circuit 110 may further include a plurality of voltage sensors S1, S2, S3, and S4. The voltage sensors S1, S2, S3, and S4 may be respectively connected between opposite ends of the cells cell1, cell2, cell3, and cell4 to detect cell voltages of the cells cell1, cell2, cell3, and cell4.

When a signal for commanding cell balancing is received from the controller 130, the cell balancing controller 120 may control the cell balancing circuit 110 to perform the cell balancing on the cells cell1, cell2, cell3, and cell4 based on a state of charge (SOC) of the cells cell1, cell2, cell3, and cell4.

In the present exemplary embodiment, a complete discharge function of the cell balancing circuit 110 may be used for fast and safe complete discharge of the battery 100 when the battery pack 10 is discarded.

The complete discharge function of the battery 100 must operate only when it is discarded, and may cause serious problems in the case of malfunction. For example, when a vehicle equipped with the battery pack 10 malfunctions due to a communication error or the like during driving, this may pose a serious risk to vehicle safety.

Therefore, in the exemplary embodiment, the cell balancing controller 120 that finally controls the cell balancing circuit 110 is designed to determine whether the complete discharge function is to be operated or not in order to minimize the error in the process of transferring the complete discharge command to the cell balancing circuit 110. In addition, the cell balancing controller 120 may control the complete discharge function of the cell balancing circuit 110 to operate only when receiving a signal commanding the complete discharge from a plurality of apparatuses that are completely independent of each other without interrelationship. For example, the cell balancing controller 120 may control the Complete discharge function of the cell balancing circuit 110 to operate only when it receives the signal commanding the complete discharge from both the controller 130 and the mechanical switch 140.

When a request for complete discharge of the battery pack 10 is received from an external device 20 (e.g., an electronic control unit (ECU) inside a vehicle) outside the battery pack 10, the controller 130 may transfer a signal commanding the complete discharge of the battery pack 10 to the cell balancing controller 120. The controller 130 may receive a complete discharge request from the external device 20 through a communication line such as a controller area network (CAN) bus. In addition, the controller 130 may transmit a signal commanding the complete discharge of the battery 100 to the cell balancing controller 120 through the communication line.

The mechanical switch 140 may be outside the battery pack 10, and may be operated by a mechanical operation. When the mechanical switch 140 is manually operated by a user, a signal commanding complete discharge may be transmitted to the cell balancing controller 120. The mechanical switch 140 may be disposed outside the battery pack 10 to facilitate user operation. As the mechanical switch 140, a jumper switch or the like may be used.

When the signal commanding the complete discharge is received from both the controller 130 and the mechanical switch 140, the cell balancing controller 120 drives the switches SW1, SW2, SW3, and SW4 to perform the complete discharge function on the cells cell1, cell2, cell3, and cell4.

Each of the cells cell1, cell2, cell3, and cell4 may be exposed to the risk of fire if it is continuously discharged due to its chemical characteristic. Accordingly, while performing the complete discharge using the cell balancing circuit 110 for discarding the battery pack 10, the cell balancing controller 120 stops the complete discharge in order to secure the safety of a cell that has reached a predetermined state.

For example, the cell balancing controller 120 may stop the complete discharge of a cell having a current flowing through a discharge resistor during the complete discharge using the cell balancing circuit 110 when it has a discharge stop current or less. In this case, the cell balancing controller 120 may include a current sensor (not illustrated) capable of detecting a current flowing through the discharge resistors R1, R2, R3, and R4 for each of the cells cell1, cell2, cell3, and cell4.

In addition, for example, the cell balancing controller 120 may stop the complete discharge for a cell having a cell voltage reaching a discharge stop voltage during the complete discharge using the cell balancing circuit 110. In this case, the cell balancing controller 120 may continuously monitor cell voltages of each of the cells cell1, cell2, cell3, and cell4 through a plurality of voltage sensor S1, S2, S3, and S4 while performing the complete discharge of the cell balancing circuit 110.

The discharge stop voltage serving as a reference for stopping the complete discharge of each of the cells cell1, cell2, cell3, and cell4 may be set as a discharge final voltage of each of the cells cell1, cell2, cell3, and cell4. The discharge final voltage may be set differently depending on a specification of the battery 100.

The discharge stop voltage serving as a reference for stopping the complete discharge of each of the cells cell1, cell2, cell3, and cell4 may be set corresponding to an operation voltage of the cell balancing controller 120. For example, when the operation voltage of the cell balancing controller 120 and the discharge final voltage of each of the cells cell1, cell2, cell3, and cell4 are set to 10 V and 2 V, respectively, and the discharge final voltage is set as the discharge stop voltage, the voltage of the battery 100 may become lower than the operation voltage of the cell balancing controller 120 before the cell voltage of each of the cells cell1, cell2, cell3, and cell4 reaches the discharge stop voltage, whereby the cell balancing controller 120 may stop operating. When the operation of the cell balancing controller 120 is stopped, the discharge path of each of the cells cell1, cell2, cell3, and cell4 is opened so as to stop the complete discharge. Therefore, when the operation voltage of the cell balancing controller 120 is larger than a sum of the discharge final voltages of the cells cell1, cell2, cell3, and cell4, the discharge stop voltage may be set corresponding to the operation voltage of the cell balancing controller 120.

The discharge stop voltage serving as a reference for stopping the complete discharge of each of the cells cell1, cell2, cell3, and cell4 may be set by the controller 130. In this case, the controller 130 may set the discharge stop voltage based on a control signal received from the outside.

The cell balancing controller 120 may open the switch in the discharge path to stop the discharge for a cell determined to satisfy a complete discharge termination condition.

In the case of an abnormal cell, a continuous discharge for complete discharge may cause a fire or the like. Therefore, in the exemplary embodiment, a process of detecting an abnormal cell among the cells cell1, cell2, cell3, and cell4 may be performed before the complete discharge using the cell balancing circuit 110 is performed. In addition, normal cells among the cells cell1, cell2, cell3, and cell4 except for the abnormal cell may be controlled to be completely discharged using the cell balancing circuit 110.

The process of detecting the abnormal cell among the cells cell1, cell2, cell3, and cell4 may be performed by the cell balancing controller 120. The cell balancing controller 120 may detect a cell voltage of each of the cells cell1, cell2, cell3, and cell4 through the voltage sensors S1, S2, S3, and S4, to detect an abnormal cell based on the detected cell voltages.

The process of detecting the abnormal cell among the cells cell1, cell2, cell3, and cell4 may be performed by the controller 130. In this case, when the complete discharge is requested from the outside, the controller 130 may detect an abnormal cell among the cells cell 1, cell 2, cell 3, and cell 4, and may transmit information related to the abnormal cell together when transmitting the signal commanding the complete discharge.

When a number of the cells constituting the battery 100 is large, when the complete discharge function using the cell balancing circuit 110 is operated for all the cells, a discharge current may be too large to be exposed to the risk of fire. Accordingly, in the exemplary embodiment, the complete discharge function using the cell balancing circuit 110 may be operated for the cells cell 1, cell 2, cell 3, and cell 4.

The cell balancing controller 120 may divide the cells cell 1, cell 2, cell 3, and cell 4 into a plurality of cell groups, and may control the cell groups to have different starting times of the complete discharge using the cell balancing circuit 110.

The cell balancing controller 120 may detect the cell voltage of each of the cells cell1, cell2, cell3, cell4 through the voltage sensors S1, S2, S3, and S4, and may control the starting times of the complete discharge using the cell balancing circuit 110 for each of the cells cell1, cell2, cell3, and cell4 to be different from each other depending on the detected cell voltages. For example, when the cell voltage is higher, the starting times of the complete discharge may be controlled to be faster.

The battery pack 10 may further include an output device 150 such as a buzzer or a light emitting device. The cell balancing controller 120 may output notification of a complete discharge state through the output device 150 when the complete discharge function using the cell balancing circuit 110 is performed.

For example, the cell balancing controller 120 may output finishing of complete discharge through a sound output device such as the buzzer when the complete discharge of all the cells cell1, cell2, cell3, and cell4 is finished. For example, the cell balancing controller 120 may control lighting of the light emitting device such as an LED to display the complete discharge state of each of the cells cell1, cell2, cell3, and cell4.

When the complete discharge function using the cell balancing circuit 110 is performed, the cell balancing controller 120 may transmit the notification of the complete discharge state to an upper controller (not illustrated) such as the ECU of the vehicle or a display (not illustrated) through the communication line.

In the battery pack 10 of the above structure, the cell balancing controller 120 or the controller 130 may be implemented by a processor implemented at least one central processing unit (CPU), a microprocessor, or other chipsets.

Figure 3:
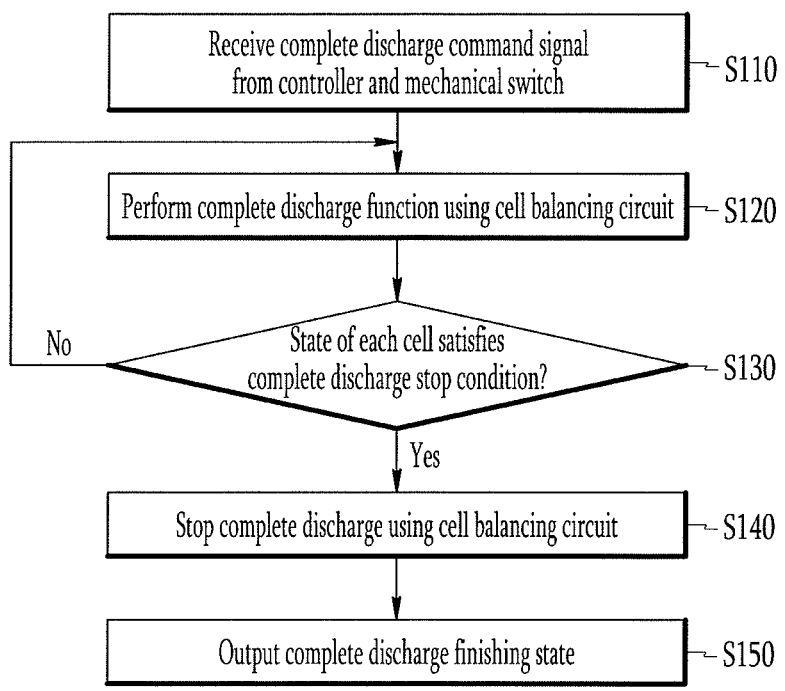
FIG. 3 schematically illustrates a complete discharge method of a battery pack according to an exemplary embodiment.

FIG. 3 schematically illustrates a complete discharge method of a battery pack according to an exemplary embodiment.

Referring to FIG. 3, according to the exemplary embodiment, the cell balancing controller 120 of the battery pack 10 receives a signal commanding complete discharge from both the controller 130 and the mechanical switch 140 (S110), and then performs the complete discharge function using the balancing circuit 110 (S120).

In step S120, the cell balancing controller 120 may control the switches SW1, SW2, SW3, and SW4 of the cell balancing circuit 110 to close the discharge path, thereby performing the complete discharge by the discharge resistors R1, R2, R3, and R4.

In step S120, the cell balancing controller 120 may control the cell balancing circuit 110 such that the complete discharge function using the cell balancing circuit is operated only for normal cells among the cells cell1, cell2, cell3, and cell4. In this case, the cell balancing controller 120 may further perform a step of determining an abnormal cell among the cells cell1, cell2, cell3, and cell4 before the step S120.

When the complete discharge is started, the cell balancing controller 120 determines whether a state of each of the cells cell1, cell2, cell3, and cell4 satisfies a complete discharge stop condition by continuously monitoring the states of the cells cell1, cell2, cell3, and cell4 (S130).

For example, when a discharge current of each of the cells cell1, cell2, cell3, and cell4 is a discharge stop current or less, the cell balancing controller 120 may determine that the complete discharge stop condition is satisfied. For example, when a cell voltage of each of the cells cell1, cell2, cell3, and cell4 reaches a discharge stop voltage, the cell balancing controller 120 may determine that the complete discharge stop condition is satisfied.

The cell balancing circuit 110 opens the switches SW1, SW2, SW3, and SW4 so as to finish the complete discharge using the cell balancing circuit 110 when the state of each of the cells cell1, cell2, cell3, and cell4 satisfies the complete discharge stop condition (S140).

Then, notification of a complete discharge finishing state is outputted through the output device 150, or notification of the finishing of the complete discharge is outputted to the upper controller (S150).

According to the above-described embodiments, it is possible to completely and safely discharge the battery in a state where the battery pack is mounted in the system without a separate discharge device by performing the complete discharge of the battery using the cell balancing circuit. In addition, it is possible to shorten a complete discharge time by using the cell balancing circuit to allow a maximum current that is available to continuously flow.

While exemplary embodiments of the present invention have been particularly shown and described with reference to the accompanying drawings, the specific terms used herein are only for the purpose of describing the invention and are not intended to define the meanings thereof or be limiting of the scope of the invention set forth in the claims. Therefore, those skilled in the art will understand that various modifications and other equivalent embodiments of the present invention are possible. Consequently, the true technical protective scope of the present invention must be determined based on the technical spirit of the appended claims.

DESCRIPTION OF SYMBOLS

10: battery pack
100: battery
110: cell balancing circuit
120: cell balancing controller
130: controller
140: mechanical switch
150: output device

The invention claimed is:

1. A battery pack comprising:
a battery configured to include a plurality of cells;
a cell balancing circuit configured to include a discharge circuit for each of the cells;
a controller configured to output a first complete discharge signal based on a control signal input from the outside;
a mechanical switch configured to output a second complete discharge signal by mechanical manipulation; and
a cell balancing controller configured to control the cell balancing circuit such that complete discharge of each cell is performed through the discharge circuits when the first complete discharge signal and the second complete discharge signal are received.

2. The battery pack as claimed in claim 1, wherein
the cell balancing controller controls the cell balancing circuit such that the complete discharge is performed only for cells other than an abnormal cell among the cells.

3. The battery pack as claimed in claim 2, wherein
the cell balancing circuit further includes a plurality of voltage sensors for detecting cell voltages of the cells, and
the cell balancing controller detects abnormal cells based on the cell voltages detected by the voltage sensors.

4. The battery pack as claimed in claim 2, wherein
the controller detects the abnormal cell, and transmits information related to the abnormal cell to the cell balancing controller.

5. The battery pack as claimed in claim 1, wherein
the cell balancing controller controls the cell balancing circuit such that the complete discharge using the discharge circuit is sequentially executed for the cells.

6. The battery pack as claimed in claim 5, wherein
the cell balancing controller divides the cells into a plurality of cell groups, and controls the cell groups to have different starting times of the complete discharge using the cell balancing circuit.

7. The battery pack as claimed in claim 5, wherein
the cell balancing circuit further includes a plurality of voltage sensors for detecting cell voltages of the cells, and
the cell balancing controller controls starting times of the complete discharge using the cell balancing circuit for the cells to be different from each other depending on the cell voltages of the cells.

8. The battery pack as claimed in claim 1, wherein
the cell balancing controller controls the cell balancing circuit to stop the complete discharge using the discharge circuit for cells having discharge currents that are less than a predetermined value.

9. The battery pack as claimed in claim 1, wherein
the cell balancing controller controls the cell balancing circuit to stop the complete discharge using the discharge circuit for cells having cell voltages reaching a discharge stop voltage.

10. The battery pack as claimed in claim 9, wherein
the controller sets the discharge stop voltage based on a control signal received from the outside.

11. The battery pack as claimed in claim 9, wherein
the discharge stop voltage is a discharge final voltage of each of the cells.

12. The battery pack as claimed in claim 9, wherein
the discharge stop voltage is set based on an operation voltage of the cell balancing controller.

13. The battery pack as claimed in claim 1, wherein
the discharge circuit includes a discharge resistor and a switch constituting a discharge path of each of the cells, and
the cell balancing controller controls the switch to control the complete discharge of each of the cells.

14. The battery pack as claimed in claim 1, wherein
the cell balancing controller controls the cell balancing circuit to perform cell balancing to reduce a voltage difference between the plurality of cells when the cell balancing is requested.

15. The battery pack as claimed in claim 1, wherein
the mechanical switch is configured to output the second complete discharge signal in response to mechanical manipulation by a user.

16. The battery pack as claimed in claim 1, wherein
the complete discharge function of the battery pack is configured to operate only when the battery pack is to be discarded.

17. The battery pack as claimed in claim 1, wherein
the cell balancing controller is configured to control the cell balancing circuit to perform complete discharge of each cell only when both of the first complete discharge signal and the second complete discharge signal are received.

18. The battery pack as claimed in claim 1, wherein
the first complete discharge signal and the second complete discharge signal are completely independent of each other.

\* \* \* \* \*